United States Patent
Li et al.

(10) Patent No.: US 8,483,330 B2
(45) Date of Patent: Jul. 9, 2013

(54) METHODS AND APPARATUS FOR OFDM SYMBOL SYNCHRONIZATION FOR IN-DOOR DIGITAL TV RECEPTION

(75) Inventors: Lingjie Li, Ottawa (CA); Shiquan Wu, Nepean (CA)

(73) Assignee: Wi-Lan Inc., Ottawa, ON (CA)

(*) Notice: Subject to any disclaimer, the term of this patent is extended or adjusted under 35 U.S.C. 154(b) by 956 days.

(21) Appl. No.: 12/551,980

(22) Filed: Sep. 1, 2009

(65) Prior Publication Data

US 2011/0051862 A1    Mar. 3, 2011

(51) Int. Cl.
*H03D 1/00* (2006.01)

(52) U.S. Cl.
USPC ......................................................... 375/343

(58) Field of Classification Search
USPC ......................................................... 375/343
See application file for complete search history.

(56) References Cited

U.S. PATENT DOCUMENTS

| | | | |
|---|---|---|---|
| 5,732,113 | A | 3/1998 | Schmidl et al. |
| 6,226,337 | B1 | 5/2001 | Klank et al. |
| 2003/0227866 | A1* | 12/2003 | Yamaguchi .............. 370/208 |
| 2007/0036234 | A1 | 2/2007 | Chen et al. |
| 2007/0098096 | A1 | 5/2007 | Akita et al. |
| 2009/0147900 | A1* | 6/2009 | Lee et al. .............. 375/362 |
| 2009/0262842 | A1* | 10/2009 | Gu et al. .............. 375/260 |

OTHER PUBLICATIONS

"On Synchronization in OFDM Systems Using the Cyclic Prefix", Jan-Jaap van de Beek et al., Div. of Signal Processing, Lulea University of Technology, S-971 87 Lulea, Sweden, pp. 663-667.

"About The New OFDM Symbol Synchronization Method", Jason Li, WiLan Corporation.

"A Novel Guard Interval Based ISI-Free Sampling Region Detection Method for OFDM Systems", Chorng-Ren Sheu et al., Computer & Communications Research Labs, Industrial Technology Research Institute, National Chiao Tung University, Hsinchu 300 Taiwan, R.O.C., 2004 IEEE, pp. 515-519.

"Data Transmission by Frequency-Division Multiplexing Using the Discrete Fourier Transform", S.B. Weinstein et al., IEEE Transactions on Communication Technology, vol. Com-19, No. 5, Oct. 1971, pp. 628-634.

"Orthogonal Frequency Division Multiplexing (OFDM)", Intuitive Guide to Principles of Communications, www.complextoreal.com, 2004 Charan Langton, Orthogonal Frequency Division Multiplex (OFDM) Tutorial, pp. 1-22.

"The How and Why of COFDM", J.H. Stott, BBC Research and Development, EBU Technical Review, Winter 1998, Tutorial—COFDM, pp. 1-14.

* cited by examiner

*Primary Examiner* — Chieh M Fan
*Assistant Examiner* — Tanmay Shah
(74) *Attorney, Agent, or Firm* — Marks & Clerk; Richard J. Mitchell

(57) ABSTRACT

A received signal comprises a continuous sequence of symbols $\phi_1, \phi_2, \ldots \phi_n$, each represented by a sequence of samples $X_0, X_2, \ldots X_{n-1}$, and wherein the symbols have a guard period GP of duration $T_{gp}$ at the beginning thereof. Each guard period contains a cyclic prefix with the same subsequence of samples as a tail end portion of the associated symbol. The symbols are identified by delaying the received signal by a fixed number of samples, computing the correlation of the received signal with the delayed signal, computing the summation of said correlation over a window of duration $T_i$, wherein $T_i > T_{gp}$, and sliding the window over the correlation to find a characteristic point or region. The start of each symbol for further processing is selected from the characteristic point or region. By increasing the duration of the window, more robust performance can be achieved, especially in multipath conditions.

29 Claims, 4 Drawing Sheets

(a)

(b)

METHODS AND APPARATUS FOR OFDM SYMBOL SYNCHRONIZATION FOR IN-DOOR DIGITAL TV RECEPTION

FIELD OF THE INVENTION

This invention relates to the field of digital communications, and in particular to a method and apparatus for symbol synchronization in modulated transmission schemes, such as orthogonal frequency division multiplexing (OFDM).

BACKGROUND OF THE INVENTION

In digital wireless communication systems, such as digital TV broadcasting systems, electromagnetic waves radiated from the transmitter can arrive at the receiver following multiple paths, with each path resulting in a copy of the transmitted signal with possibly different time delay, phase distortion and energy attenuation. This is the so-called multipath phenomenon.

There are several digital TV standards developed and deployed in the world. Among these are the DVB-T standard used in Europe and most countries in Asia, Africa, Australia and New Zealand, and the ISDB-T standard used in Japan and Brazil. Both standards use OFDM as the modulation and multiplexing scheme in the physical layer due to the relative robustness of OFDM to the so-called multipath phenomenon. In OFDM, the transmitted data is coded in a sequence of symbols that are modulated onto a large number of adjacent orthogonal carriers. OFDM modulation is described, for example, in "Data transmission by frequency division multiplexing using the discrete Fourier transform", Weinstein, S. B et al. IEEE Transactions on Communication Technology Vol. COM-19, No. 15, October 1971, the contents of which are herein incorporated by reference.

The effect of the multipath phenomenon in OFDM can be seen in the channel impulse response (CIR), which has a positive maximum delay spread. Multipath effects result in inter-symbol interference (ISI), which is a major problem in wireless communication systems, particularly with regard to synchronization.

There are two different OFDM modes: the burst packet mode and the continuous mode. In the burst packet mode, a received signal burst may arrive at the receiver at any time, and the burst may have varying number of OFDM symbols. Systems using this mode include ITU 802.11a and 802.16. Typically in this mode, a training signal (preamble) is transmitted at the beginning of each signal burst. Symbol synchronization is done using this preamble. In the continuous mode, OFDM symbols are transmitted continuously and regularly, but usually no preamble is provided for synchronization purposes. Systems in this mode include DVB-T and ISDB-T.

In order to address the synchronization problem in the continuous mode, the symbols, which are transmitted as a sequence of samples, are separated by a guard period (GP). Each OFDM symbol consists of a guard period, which usually is a cyclic prefix CP, followed by a so-called FFT part. The samples in the GP are identical to the samples in the tail end of the FFT part. The cyclic prefix is described in the paper "On Synchronization in OFDM Systems Using the Cyclic Prefix", Proceedings of Radio Vetenskaplig Konferens (REVK '96), pp. 663-667, Lulea, Sweden, June 1996, the contents of which are herein incorporated by reference.

It is well known that in OFDM, if the GP is longer than the CIR (channel impulse response) maximum delay spread, and if the symbol synchronization method provides a symbol start point within some tolerable range, then there will be no ISI (inter symbol interference) in the receiver, i.e., the FFT part of each symbol is free of ISI. When referring herein to ISI, we mean ISI in the FFT part of an OFDM symbol. However, OFDM is highly sensitive to symbol synchronization error. The expression ISI-free region is used herein to refer to the aforementioned tolerable range for the symbol start point that results in no ISI in the FFT part of the symbol.

An important feature of digital TV broadcasting is the use of Single Frequency Network (SFN) as a typical network scheme. In a SFN, neighboring broadcast stations broadcast the same signal simultaneously, which can help to improve receiver signal strength. However, SFN generates an artificial multipath effect, which may result in a CIR maximum delay spread much longer than the GP. In this case, ISI is unavoidable, and the symbol synchronization method requires a more accurate symbol start point to minimize ISI.

Symbol synchronization methods can be performed in the time domain or frequency domain. The frequency domain synchronization is performed after FFT operation. A common scheme is to use a time domain synchronization method to do coarse symbol synchronization, and use a frequency domain synchronization method to do fine symbol synchronization.

Conventional algorithms for the symbol synchronization in time domain are MLE (Maximum Likelihood Estimation) using the cyclic prefix of the OFDM symbols as described in US2001622633B1. This method achieves ideal performance only in the AWGN (Additive White Noise Gaussian) channel. To further improve the MLE estimation performance in the AWGN channel, methods using averaging over multiple OFDM symbols and filtering of the estimation results have been proposed. However, when the channel condition becomes severely degraded, data in the GP is badly contaminated by ISI, which leads to significant fluctuation of the synchronization output. To improve the performance of MLE, some schemes have been proposed utilizing GP and pilot tones (US20070098096A1) and GP and PN (pseudorandom) sequence (US20070036234A1), GP and training symbols. These methods perform better under multipath channel conditions. However, a fluctuation still exists because of the ISI contamination in GP and the limited number of pilot tones used for estimation. To mitigate the fluctuation, U.S. Pat. No. 5,732,113A1 uses specially designed training symbols in the time domain to define timing functions.

Chorng-Ren Sheu and Chia-Chi Huang, "A Novel Guard Interval based ISI Free Sampling Region Detection Method for OFDM Systems", Proceedings of IEEE Vehicular Technology Conference, September 2004, describes a scheme for estimating ISI-free boundary using the characteristics of the guard period and combining the techniques of the delay conjugate multiplication module, phase differential operation, symbol-by-symbol averaging and edge detection. According to the authors, this method guarantees the estimated OFDM start position within the ISI-free region and avoids the negative effect of ISI.

However, the current OFDM symbol synchronization methods are not accurate in multipath channel conditions.

SUMMARY OF THE INVENTION

An object of the invention is to improve the accuracy of symbol synchronization, especially in multipath channel conditions. Embodiments of the invention provide a novel OFDM symbol synchronization method suitable for use in an in-door digital TV receiver. The novel method is both simple and has good performance to find optimal symbol synchronization output. In particular embodiments of the invention permit a suitable start position for a symbol to be located in a sequence of received samples.

According to a first aspect of the invention there is provided a method of identifying a symbol for further processing in a received signal representing a physical medium wherein the received signal may travel over more than one path, wherein the received signal comprises a continuous sequence of symbols $\phi_1, \phi_2, \ldots \phi_n$, each represented by a sequence of samples $X_1, X_2, \ldots X_n$, and wherein the symbols have a guard period of duration $T_{gp}$ at the beginning thereof, each guard period containing a cyclic prefix with the same subsequence of samples as a tail end portion of the associated symbol, the method comprising: delaying the received signal by a fixed number of samples; computing the correlation of the received signal with the delayed signal; computing the summation of said correlation over a window of duration $T_i$, wherein $T_i > T_{gp}$; sliding said window over the correlation to find a characteristic point or region; and deriving the start of each symbol for further processing from said characteristic point or region. The physical medium may, for example, be sound or video images.

When the CIR maximum delay spread is less than the duration of the guard period $T_{gp}$, it is possible to find a region free of inter-symbol interference. In this case, the method according to an embodiment of the invention will identify a plateau or flat region in the summation with the substantially greatest value, known as the top-flat region. For the ISI-free region as defined above, the start of the symbol can be found by subtracting a fixed value, typically the duration of the sliding window, from a point within this region. The left boundary of the region defines the point where the ISI from the previous symbol disappears. The right boundary defines the point where the ISI from the next symbol starts. Unlike the prior art, the invention allows a point for the start of the symbol to be found that is well clear of the boundaries, for example, by finding a point represented by the average of the boundaries. This ensures a more robust performance than is possible with the prior art.

While the invention offers an improvement when the summation window $T_i$ is greater than $T_{gp}$, in a preferred embodiment it is $2T_{gp}$. In accordance with the principles of the invention, the length of the summation window $T_i$ is deliberately set to be greater than $T_{gp}$. A practical lower limit could be $T_i \geq 1.1 T_{gp}$.

When the CIR maximum delay spread is greater than the duration of the guard period $T_{gp}$, some degree of inter-symbol interference is inevitable. In this case the characteristic point or region is a peak associated with the point of substantially least inter-symbol interference. The start point is again located by subtracting from the peak a fixed time value to find the point of substantially least inter-symbol interference. Of course, it will be understood by one skilled in the art, that by selecting a point not precisely at the peak, the inter-symbol interference may not be strictly a minimum, but nonetheless tolerable, and such an embodiment is intended to be encompassed within the scope of the invention.

The correlation may be computed for each symbol by computing the product of the complex conjugate of the received signal and the delayed signal, or the product of the received signal and the complex conjugate of the delayed signal. The summation is performed on the magnitude of the product.

Typically, the received signal is an OFDM signal containing OFDM symbols, for example a DVB-T TV signal.

In accordance with another aspect the invention provides an apparatus for demodulating a received signal representing a physical medium wherein the received signal may travel over more than one path, wherein the received signal comprises a continuous sequence of symbols $\phi_1, \phi_2, \ldots \phi_n$, each represented by a sequence of samples $X_1, X_2, \ldots X_n$, and wherein the symbols have a guard period of duration $T_{gp}$ at the beginning thereof, each guard period containing a cyclic prefix with the same subsequence of samples as a tail end portion of the associated symbol, the apparatus comprising: an analog-to-digital converter for converting the received signal to digital form;
a synchronization unit configured to:
(I) delay the received signal by a fixed number of samples;
(ii) compute the correlation of the received signal with the delayed signal;
(iii) compute the summation of said correlation over a window of duration $T_i$, wherein $T_i > T_{gp}$;
(iv) slide said window over the correlation to find a characteristic point or region; and
(v) derive the start of each symbol for further processing from said characteristic point or region; and
a demodulator for demodulating each symbol identified by the synchronization unit in step (v).

In a still further aspect the invention provides a method of identifying a start time of a symbol in a wireless signal, where the symbol is separated from a previous symbol by a guard period GP, and the GP includes a sequence of samples identical with the last sequence of samples in the symbol, comprising: a) receiving the guarded symbol including the GP and the symbol; b) delaying the guarded symbol by GP to obtain a delayed version of the guarded symbol; c) processing the guarded symbol and the delayed version to identify a start-time interval characterized by a low inter-symbol interference; and d) selecting the start time for symbol in the time interval.

Low inter-symbol interference in this context means either no inter-symbol interference, which is possible when CIR maximum delay spread is less than the guard period, or either minimum inter-symbol interference when CIR maximum delay spread is greater than the guard period duration, or at least inter-symbol interference that has been reduced to an acceptable level. Clearly, it is not essential to operate precisely at the point of minimum inter-symbol interference in order to benefit from the invention, even though that is what represents the optimum point.

BRIEF DESCRIPTION OF THE DRAWINGS

The invention will now be described in more detail, by way of example only, with reference to the accompanying drawings, in which.

DETAILED DESCRIPTION OF EXEMPLARY EMBODIMENTS

Figure 1:
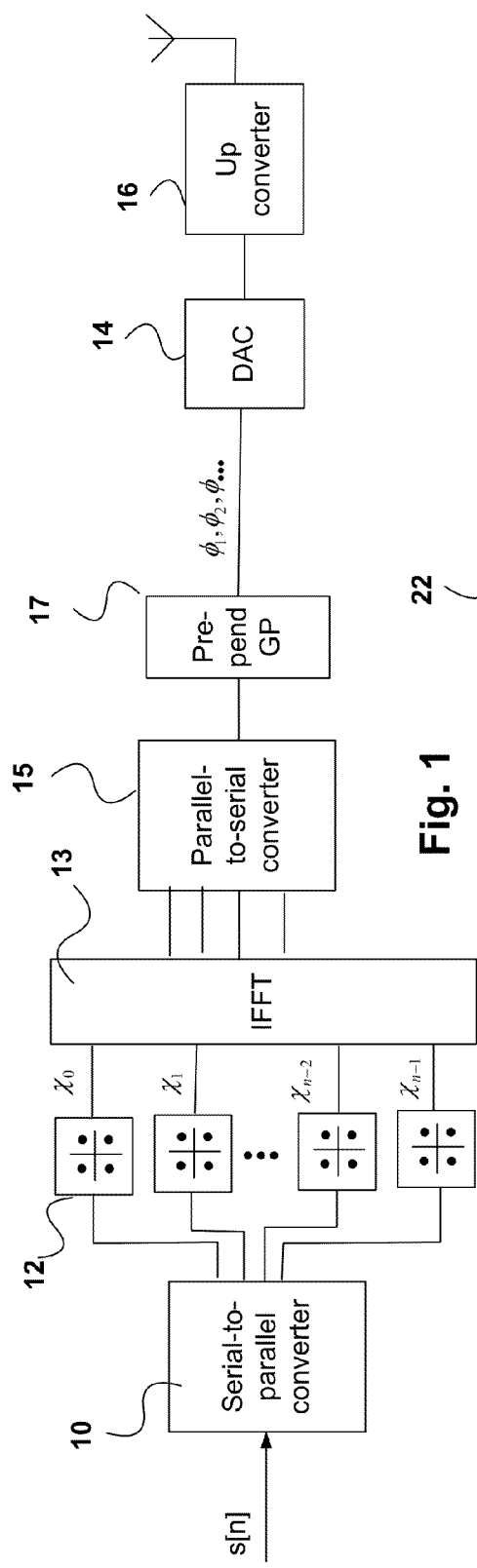
FIG. 1 is a simplified block diagram of an OFDM transmitter.

In FIG. 1, a data signal s[n] consisting of a sequence of bits is passed through a serial-to-parallel converter 10 to constellation mapping units $12^1 \ldots 12^n$, which output parallel sets of values $[\chi_0 \ldots \chi_n]$. These in turn are passed through an inverse Fast Fourier Transform (IFFT) unit 13. The output of the IFFT unit passes through a parallel-to-serial converter 15 whose output is pre-pended with GP in unit 17 to create OFDM time domain symbols $\phi_1, \phi_2, \phi_3, \ldots$, represented by the sample vectors $[X_0, X_1, \ldots X_n]$. The samples are passed through the digital-to-analog converter 14, and modulator 16 to produce the transmitted RF signal.

Figure 2:
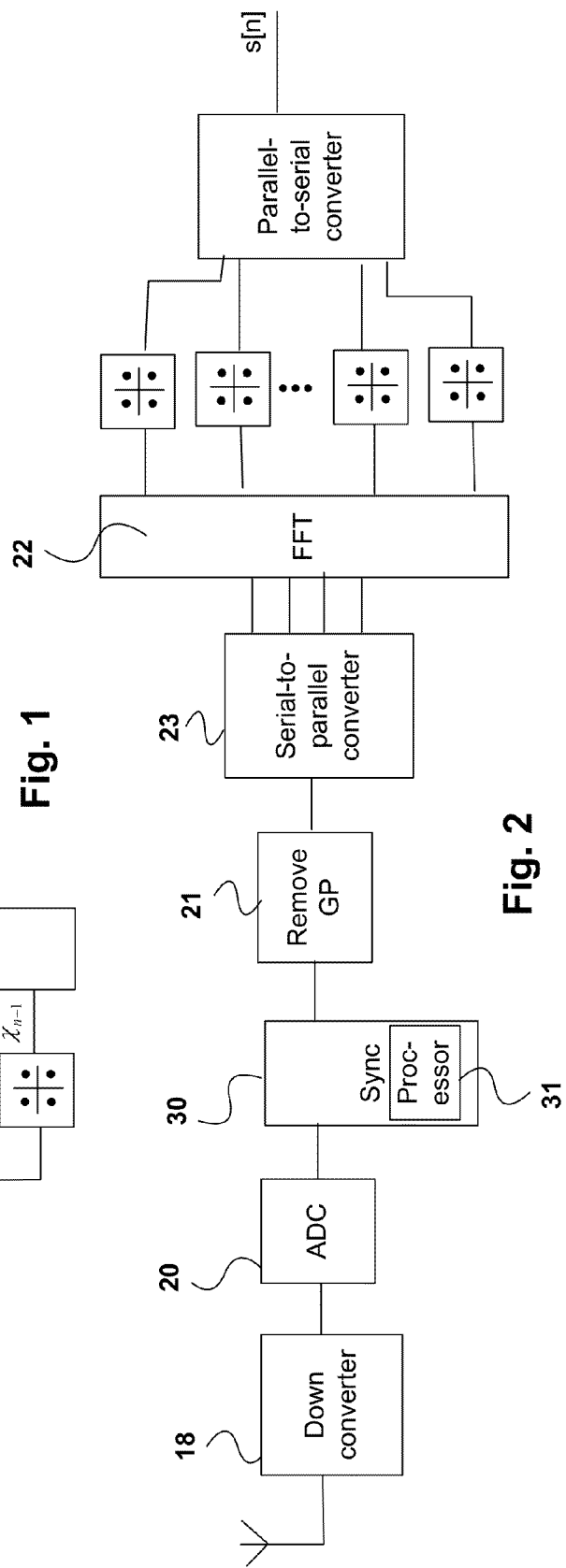
FIG. 2 is a simplified block diagram of an OFDM receiver.

In the receiver, shown in FIG. 2, the reverse process occurs. The incoming RF signal is down-converted to baseband by downconverters 18, and passed through analog-to-digital converter 20 to synchronization unit 30. This will normally be implemented in software in a digital signal processor 31, but could also be implemented in hardware.

The OFDM symbols $\phi 1, \phi 2, \phi 3, \ldots$ whose start positions are identified in the synchronization unit 30, have their GP part removed in unit 21. The resulting FFT part of each symbol are serial-to-parallel converted in unit 23, and are then passed through Fast Fourier Transform unit 22, to recover the values $[X_0 \ldots X_{n-1}]$ for input to the constellation demappers 24. These in turn output the original data s[n]. It should be noted that while it is conventional to put the IFFT in the transmitter and the FFT in the receiver, these units form a linear pair and can be reversed.

In order to correctly transform the incoming data in the FFT unit 22, the start of the incoming OFDM symbols output from the ADC must be properly identified. Each OFDM symbol comprises the vector consisting of samples $[X_0 \ldots X_{n-1}]$. Symbol synchronization determines the correct symbol start position, which, with a $T_{gp}$ offset, determines the FFT window start position before the FFT demodulation at the receiver. The FFT window is a time domain region within which samples are viewed as FFT part of an OFDM symbol. If the estimated start position of the OFDM symbol is located within the ISI-free region, the FFT part will not be affected by ISI, and the phase rotation caused by timing offset can be easily corrected after FFT. If the estimated start position is located outside this region, the sampled FFT part will contain radiated energy of a neighboring symbol, which will cause the dispersion of signal constellation and reduce the system performance accordingly.

Figure 3:
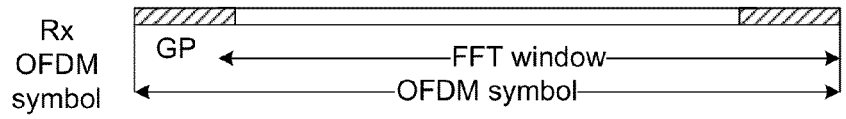
FIG. 3 is a diagram of an OFDM symbol with guard period.

A complete OFDM symbol is shown in FIG. 3. The guard period GP of duration $T_{gp}$ at the beginning of the symbol contains the same sequence of samples $X_{n-i} \ldots X_{n-1}$ as the tail end. This is known as the cyclic prefix CP referred to above. The FFT part is from the end of the guard period to the end of the symbol. Because of the cyclic nature of the prefix in the guard period, the FFT window can be shifted anywhere within the symbol and a valid result still obtained. For example, if the FFT window is shifted two samples to the left, the last two samples at the end of the symbol will be missed, but they will be picked up as the last two samples in the guard period.

Figure 4:
FIG. 4 shows the results of a correlation in the absence of multipath effects.
Figure 5:
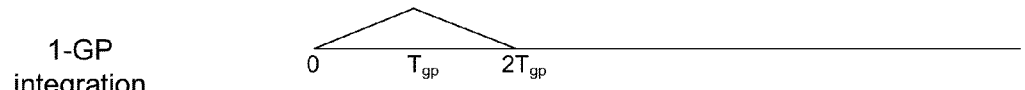
FIG. 5 shows the results of performing a one guard period integration.
Figure 6:
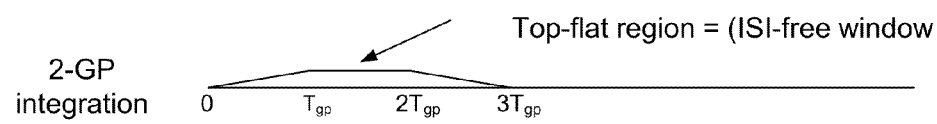
FIG. 6 shows the results of performing a two-guard period integration in the case of no multipath effects.

In order to detect the start of the symbol, a correlation is performed wherein the incoming data is delayed by an amount equal to the length of the guard period $T_{gp}$, and compared with the undelayed data. In the absence of multipath effects, there would of course be an exact match between the cyclic prefix and the end part of the symbol as shown in FIG. 4. In this case, a summation of the magnitude of the complex product of the delay signal with its complex conjugate or vice versa with a sliding window of $T_{gp}$ (1-GP integration) would result in a single peak as shown in FIG. 5. When the leading edge of the window reaches the start of the cyclic prefix, the summation begins to increase as the correlation has constant phase until it reaches a maximum when the leading edge of the sliding window reaches the end of the cyclic prefix, at which time it will begin to fall off until for a window starting at the end of the cyclic prefix, the summation will be again around zero. On the other hand, a summation with a sliding window of length $2T_{gp}$ (2-GP integration) would result in a top-flat region of length $T_{gp}$ between time instances $T_{gp}$ and $2T_{gp}$ (where time 0 corresponds to the start point of GP) as shown in FIG. 6 because the summation will remain substantially constant as the window slides over the guard period from the time the leading edge of the window reaches the end of the cyclic prefix until the time the tailing edge of the window reaches the start of the cyclic prefix because during this time the entire cyclic prefix falls within the sliding window. Subtracting $T_{gp}$ from any point in the top-flat region will give a start point in the ISI-free region.

Figure 7:
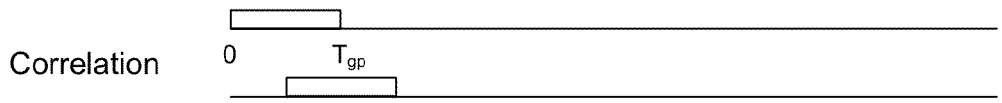
FIG. 7 shows the correlation received on different paths.

However, multipath effects cause multiple copies of the transmitted signal to arrive at the receiver. The above correlation between the received signal and its delayed version is equivalent to the summation of correlation results between all combinations of two received copies of the transmitted signal. Among all the combinations, only the ones consisting of a copy and itself have their correlation result co-phased in the GP part. This is shown in FIG. 7 where the CIR has two rays and therefore two copies of the transmitted signal arrive at the receiver. The ISI-free region is from the point when the last arrived copy starts to the point when the GP of the first arrived copy ends.

Figure 8:
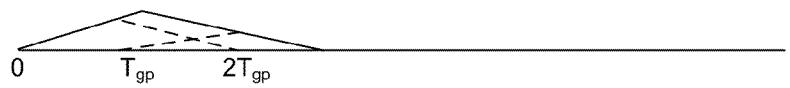
FIG. 8 shows the effects of one GP length sliding window summation (which is referred to herein as 1-GP integration) for the case of FIG. 7.

FIG. 8 shows the prior art method of identifying the start position. The magnitude of the product of the signal and the complex conjugate of the delayed signal is summed over a window with one guard period $T_{gp}$ starting at the beginning of a candidate sequence. The resulting sum gradually increases as the window is moved in time till the end of GP of the first arrived copy of the transmitted signal. The sum arrives at its peak between this point and the time when the GP of the last arrived copy ends. Then the sum starts to fall off. The peak is taken as the start point of the symbol and represents one start point which is ISI free.

Figure 9:
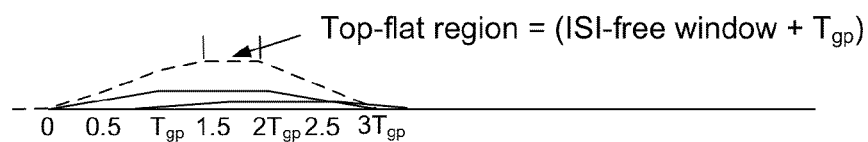
FIG. 9 shows the effects of two GP length sliding window summation (which we call 2-GP integration) for the case of FIG. 7.

In accordance with an embodiment of the invention, the length of the sliding window over which the summation occurs is increased to $2T_{gp}$. However, an improvement can be achieved by increasing the length of the sliding window by less than this amount provided it is greater than $T_{gp}$. FIG. 9 shows what happens when the length of the sliding window is $2T_{gp}$. The summation initially increases as before, first due to the contribution of the first arrived copy and then due to the overlapping contribution of the second arrived copy, but then instead of reaching a peak and falling off, as in the case of a window of length $T_{gp}$, it forms a flat region (hereinafter referred to as the top-flat region), where the summation is substantially constant. The reason for this is that in the region where the GPs of the two copies overlap, the contributions from the two copies remain substantially constant when the summation period is increased beyond $T_{gp}$. This top-flat region identifies an ISI-free start point+$T_{gp}$, and unlike the case where summation only occurs over $T_{gp}$, a start point can be chosen that is in the middle of the overlap region clear of the edges. Thus, instead of selecting a start point that is at the limit of where ISI will occur, this embodiment identifies a start point well clear of the point at which ISI may occur and is thus more robust than the prior art method.

Figure 10:
FIG. 10 shows the case with no overlapping guard periods, where inter-symbol interference is present.
Figure 11:
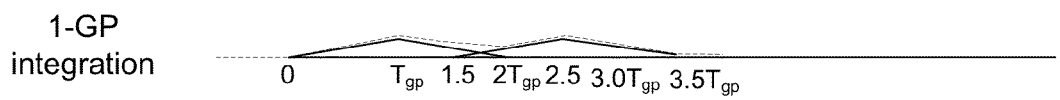
FIG. 11 shows the effect of 1-GP integration in the case of FIG. 10.
Figure 12:
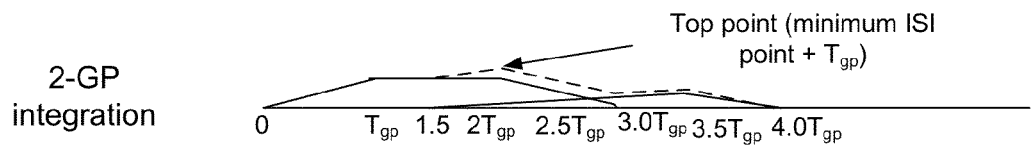
FIG. 12 shows the effect of 2-GP integration in the case of FIG. 10.

FIG. 10 shows the case where ISI is inevitably present since the correlated GPs of the direct and multipath signals do not overlap. This case is particularly likely to arise in the case of SFN, where the transmitters can be widely separated. In this case, a $T_{gp}$ window gives two separate peaks as shown in FIG. 11, whereas a $2T_{gp}$ window creates two overlapping top-flat regions for the two received signal copies respectively, which combine to create a peak at the point of minimum ISI.

In general, if CIR is within the time region $[0, T_c]$ then the ISI-free region is $[T_c, T_{gp}]$. If only the first CIR path exists, i.e. no multipath delay is present, the corresponding top-flat region has time region $[T_{gp}, T_i]$, so if $T_i = T_{gp}$ as in the prior art, it reduces to a point.

If only the last CIR path exists, i.e. ignoring the direct path, the top-flat region would lie within time region $[T_c+T_{gp}, T_c+T_i]$.

Since we have a channel lasting from time instance 0 to $T_c$, the top-flat region lies in the region $[T_c+T_{gp}, T_i]$, which is the intersection of the above two time regions.

After this region $[T_c+T_{gp}, T_i]$ has been identified, we can subtract $T_{gp}$ and get the region $[T_c, T_i-T_{gp}]$. Since the symbol start point region that is ISI-free is $[T_c, T_{gp}]$, we can safely find a point in this region if the end point lies in the range:

$T_i - T_{gp} <= T_{gp}$, i.e., $T_i <= 2T_{gp}$ (a)

$T_i - T_{gp} >= T_c$, i.e., the CIR is limited to time region $[0, T_i - T_{gp}]$ (b)

In the case where $T_i = 2T_{gp}$ (2-GP integration), the ISI-free region found is $[T_c, T_{gp}]$.

If we use $T_i < 2T_{gp}$, and assume condition (b) is satisfied, we have two choices:
a. We can subtract $T_{gp}$ to get the region $[T_c, T_i-T_{gp}]$, which is a subset of the ISI-free region $[T_c, T_{gp}]$. This gives an estimate of the start point of the ISI-free region, but not the end point.
b. Alternatively, if we subtract $T_i - T_{gp}$ from the region $[T_c + T_{gp}, T_i]$, the resulting region will be $[T_c - T_i + 2T_{gp}, T_{gp}]$. This is also a subset of the region $[T_c, T_{gp}]$ since $T_c - T_i + 2T_{gp} >= T_c$ can be simplified as $T_i <= 2T_{gp}$ which is the pre-set condition in this case. This gives an estimate of the end point of the ISI-free region, but not the start point.

From (a) and (b) we see that if we subtract a value in the region $[T_i-T_{gp}, T_{gp}]$, we can get a region that lies within the ISI-free region. This tells us that after we obtain the region $[T_c+T_{gp}, T_i]$, we have a range to choose the subtraction value. We can also choose the subtraction value to be $T_{gp}$ or $T_i - T_{gp}$ respectively and still obtain the start and end point of the ISI-free region. No matter what approach we use, we have to satisfy condition (b).

Mathematically, the invention can be understood in the following terms. In accordance with embodiments of the invention based on F(n), the 2-GP integration of the correlation performed on the receiver baseband input sequence x(n) is expressed in Equation 1.

$$F(n) = \left| \sum_{i=0}^{K-1} \sum_{j=n-2N_g+1}^{n} x(i \cdot N + j) \cdot x^*(i \cdot N + j + N_u) \right| \quad (1)$$

In this equation, is the sample index, N is the total number of samples for each OFDM symbol (including GP and FFT part), K is the number of OFDM symbols participated in the averaging operation, $N_u$ is the number of samples for the FFT part, $N_g$ is the number of samples for the GP. Note that the curve of F(n) repeats for each OFDM symbol, therefore it suffices to analyze F(n) for the length of one OFDM symbol.

Assume that CIR has time duration of $N_c T_s$, where $N_c$ is an integer number and $T_s$ is the sample duration. Then in the symbol synchronization input sequence, the guard period of a symbol is distributed in the time region $[n_{c0}T_s, n_{c0}T_s + (N_c + N_g)T_s]$, where $n_{c0}T_s$ is the time instant for the first sample in the guard period to arrive at the receiver. When $N_c < N_g$, the 2-GP integration output F(n) has the following characteristics in general:

in the index range $[n_{c0}, n_{c0}+N_c+N_g]$, $T_2(n)$ keeps increasing;

in the index range $[n_{c0}+N_c+N_g, n_{c0}+2N_g]$, $T_2(n)$ remains constant, we call this region the top-flat region of F(n);

in the index range $[n_{c0}+2N_g, n_{c0}+N_c+3N_g]$, $T_2(n)$ keeps decreasing;

for all other n values, F(n) remains small.

It is well known that in order to minimize ISI, the optimal start index for the symbol should be in the range $[n_{c0}+N_c, n_{c0}+N_g]$. This range is the same for the top-flat region of F(n), except for a $N_g$ time shift. This represents the tolerable region for the symbol synchronization output mentioned previously.

Figure 13:
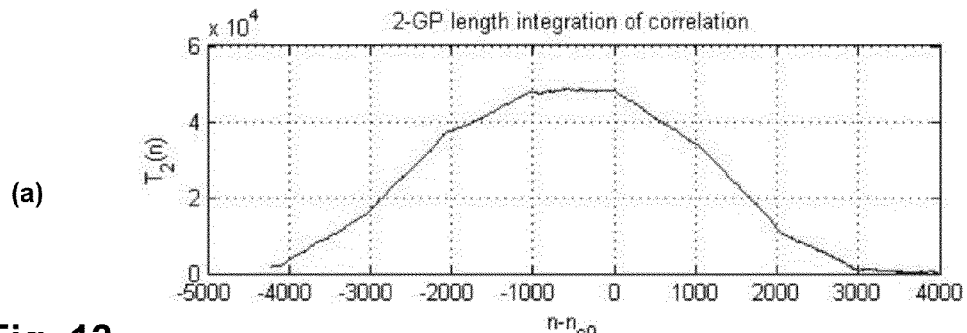
FIG. 13a shows a simulated 2-GP integration for a channel with an impulse response as shown in FIG. 13b.

The characteristics of F(n) are illustrated in the example shown in FIGS. 13a and 13b. In this example, the channel is comprised of an SFN channel with two independent fading groups. Each group is 5 μs long and represents the Rayleigh fading signal emitting from a single transmitter at 5.4 dB C/N and 150 Hz Doppler. The groups are placed at 0 and $0.5N_g$ apart. Here $N_u=8192$, $N_g=2048$. The channel CIR is shown in FIG. 13b; it has a length of 1071 samples. According to the characteristics discussed above, this channel CIR should result in a top-flat region of F(n) at sample index range $[n_{c0}-977, n_{c0}]$. This is confirmed in the upper part of the figure.

With the 2-GP integration, the symbol synchronization problem is reduced to the problem of finding a point in the top-flat region of F(n). To achieve this, we compute three output parameters: $n_{c1}$ and $n_{c2}$, the estimated start and end points of the top-flat region of F(n), and the sample index $n_{p2}$ corresponding to the maximum value of $T_2$ (n). We also compute $n_{f2}$ (the average of $n_{c1}$ and $n_{c2}$), which can be viewed as an estimate of the center of the top-flat region. Equation 2 shows how these parameters are computed. In Equation 2, $n_{c1}$ is the smallest index satisfying $F(n_{c1}-1) \leq \alpha F(n_{p2})$ $$n_{p2} = \underset{n}{\mathrm{argmax}}(F(n)), \quad (2)$$

$$n_{f2} = \frac{1}{2}(n_{c1} + n_{c2}).$$

and $$F(n_{c1}) > \alpha F(n_{p2}).$$

Similarly, $n_{c2}$ is the largest index satisfying $F(n_{c2}+1) \leq \alpha F(n_{p2})$ and $F(n_{c2}) > \alpha F(n_{p2})$. Here, $\alpha \in (0,1)$ is the scaling factor controlling the accuracy of $n_{c1}$ and $n_{c2}$.

Figure 14:
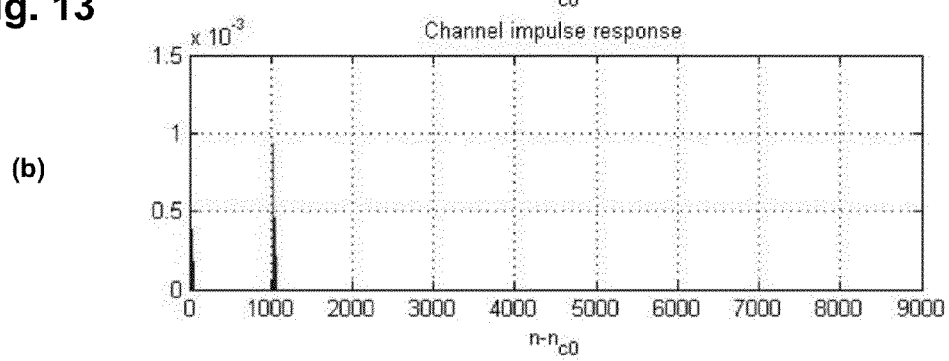
FIG. 14 is a block diagram for implementing a synchronization unit in accordance with an embodiment of the invention.
Figure 14:
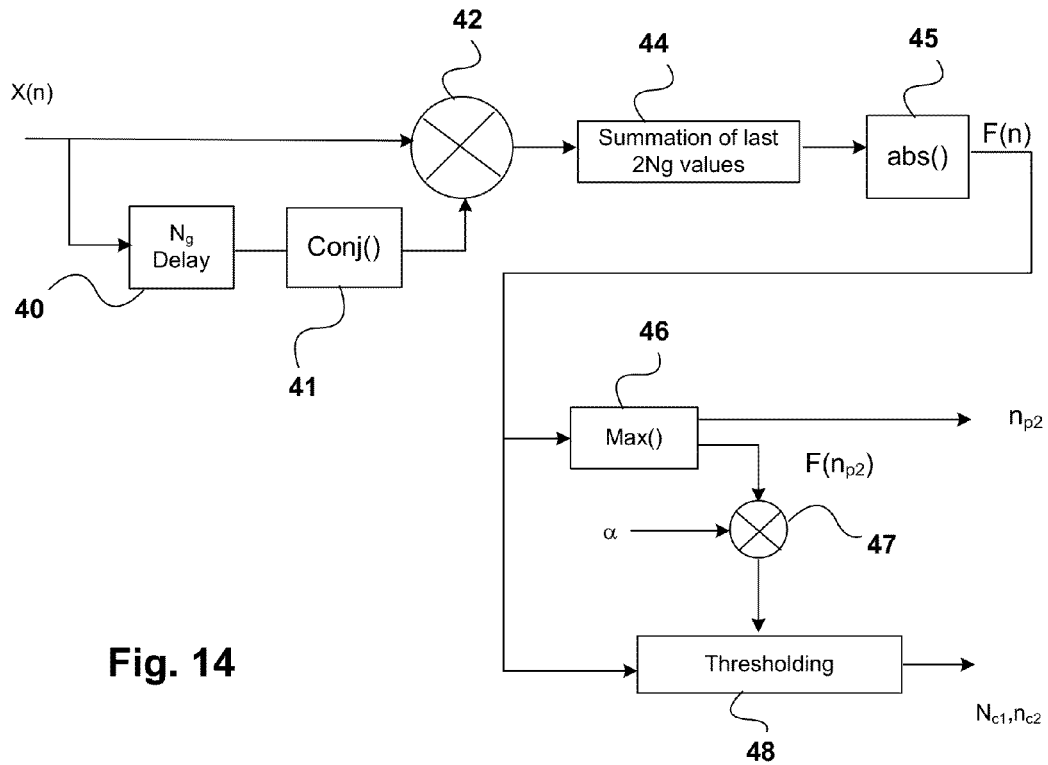

The diagram shown in FIG. 14 illustrates method of computing these parameters, which would be implemented in the synchronization unit. The incoming samples x(n) are delayed by $N_g$ in delay unit 40, and their complex conjugates are computed in unit 41. The output of unit 41 is multiplied with x(n) in multiplier 42, and the last $2N_g$ absolute values are summed in unit 44. The absolute value is extracted in unit 45 to obtain F(n). Max unit 46 outputs $n_{p2}$ and $F(n_{p2})$, and the threshold $\alpha F(n_{p2})$ is computed in unit 47. The threshold unit 48 then outputs values $n_{c1}$ and $n_{c2}$.

We can now use the above parameters to locate a position in the top-flat region as the output of the symbol synchronization method. Multiple criteria can be used. We may use the sample index $n_{p2}$ corresponding to the maximum value of F(n) as the output. Theoretically, $n_{p2}$ is located randomly in the flat-top region.

Alternatively, we may estimate the top-flat region start and end points $n_{c1}$ and $n_{c2}$, and use their average $n_{f2}$ as the output. Generally, we may linearly combine the above parameters to generate a final output identifying the start position of a symbol, which can then be processed in the conventional manner.

The new time domain symbol synchronization algorithm uses GP of OFDM symbols to locate a position in the ISI-free region; it generates optimal output to minimize ISI. The new method also has low computational complexity, and is easy to implement using DSP hardware.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

We claim:

1. A method of identifying a symbol for further processing in a received signal representing a physical medium wherein the received signal may travel over more than one path, wherein the received signal comprises a continuous sequence of symbols $\phi_1, \phi_2, \ldots \phi_n$, each represented by a sequence of samples $X_0, X_2, \ldots X_{n-1}$, and wherein the symbols have a guard period GP of duration $T_{gp}$ at the beginning thereof, each guard period containing a cyclic prefix with the same subsequence of samples as a tail end portion of the associated symbol, the method comprising:— delaying the received signal by a fixed number of samples;
  computing the correlation of the received signal with the delayed signal;
  computing the summation of said correlation over a window of duration $T_i$, wherein $T_i > T_{gp}$;
  sliding said window over the correlation to find a characteristic point or region; and
  deriving the start of each symbol for further processing from said characteristic point or region,
  wherein the channel impulse response is less than the guard period $T_{gp}$, and said characteristic point or region is a substantially top-flat region, and
  wherein the start of the symbol for further processing is derived by locating a point within said top-flat region and clear of the boundaries thereof and subtracting therefrom a fixed time value to find a point free of inter-symbol interference and clear of the boundaries where inter-symbol interference occurs.

2. A method as claimed in claim 1, wherein $T_i \geqq 1.1\, T_{gp}$.

3. A method as claimed in claim 1, wherein the $T_i = 2T_{gp}$.

4. A method as claimed in claim 1, wherein the point located within said top-flat region is obtained by taking the average of the start and end points of the top-flat region.

5. A method as claimed in claim 4, wherein said fixed time value is $T_i - T_{gp}$.

6. A method as claimed in claim 1, wherein the correlation is computed for each symbol by computing the product of the complex conjugate of the received signal and the delayed signal, or the product of the received signal and the complex conjugate of the delayed signal; and wherein the summation is performed on the magnitude of said summation.

7. A method as claimed in claim 1, wherein the received signal is an OFDM signal containing OFDM symbols.

8. A method of identifying a symbol for further processing in a received signal representing a physical medium wherein the received signal may travel over more than one path, wherein the received signal comprises a continuous sequence of symbols $\phi_1, \phi_2, \ldots \phi_n$, each represented by a sequence of samples $X_0, X_2, \ldots X_{n-1}$, and wherein the symbols have a guard period GP of duration $T_{gp}$ at the beginning thereof, each guard period containing a cyclic prefix with the same subsequence of samples as a tail end portion of the associated symbol, the method comprising:— delaying the received signal by a fixed number of samples;
  computing the correlation of the received signal with the delayed signal;
  computing the summation of said correlation over a window of duration $T_i$, wherein $T_i > T_{gp}$;
  sliding said window over the correlation to find a characteristic point or region; and
  deriving the start of each symbol for further processing from said characteristic point or region,
  wherein the channel impulse response is less than the guard period $T_{gp}$, and said characteristic point or region is a substantially top-flat region,
  wherein the channel impulse response is greater than the guard period $T_{gp}$ and the characteristic point or region is a peak associated with the point of substantially least inter-symbol interference, and
  wherein the start of the symbol for further processing is derived by subtracting from said peak a fixed time value to find the point of substantially least inter-symbol interference.

9. A method as claimed in claim 8, wherein said fixed time value is $T_i - T_{gp}$.

10. A method as claimed in claim 7, wherein said fixed period is equal to the duration of a symbol less $T_{gp}$.

11. A method as claimed in claim 7, wherein the physical medium comprises sound or video images.

12. A method of demodulating a received OFDM signal containing symbols having a guard period of duration $T_{gp}$ at the beginning thereof, each guard period containing a cyclic prefix with the same subsequence of samples as a tail end portion of the associated symbol, the method comprising:

delaying the received signal by a fixed number of samples;

computing the correlation of the received signal with the delayed signal;

computing the summation of said correlation over a window of duration $T_i$, wherein $T_i > T_{gp}$;

sliding said window over the correlation to find a characteristic point or region; and deriving the start of each symbol from said characteristic point or region; and passing the identified symbols to a demodulator, wherein the channel impulse response is less than the guard period $T_{gp}$, and said characteristic point or region is a substantially top-flat region, and wherein the start of the symbol is derived by locating a point within said top-flat region and clear of the boundaries thereof and subtracting therefrom a fixed time value to find a point free of inter-symbol interference and clear of the boundaries where inter-symbol interference occurs.

13. A method as claimed in claim 12, wherein the start of each symbol is derived from said characteristic point or region by subtracting a fixed time value from said point or a point lying within said region.

14. A method of demodulating a received OFDM signal containing symbols having a guard period of duration $T_{gp}$ at the beginning thereof, each guard period containing a cyclic prefix with the same subsequence of samples as a tail end portion of the associated symbol, the method comprising:

delaying the received signal by a fixed number of samples;

computing the correlation of the received signal with the delayed signal;

computing the summation of said correlation over a window of duration $T_i$, wherein $T_i > T_{gp}$;

sliding said window over the correlation to find a characteristic point or region; and deriving the start of each symbol from said characteristic point or region; and passing the identified symbols to a demodulator, wherein the channel impulse response is greater than the guard period $T_{gp}$ and the characteristic point or region is a peak associated with the point of substantially least inter-symbol interference, and wherein the start of the symbol for further processing is derived by subtracting from said peak a fixed time value to find the point of substantially least inter-symbol interference.

15. An apparatus for demodulating a received signal representing a physical medium wherein the received signal may travel over more than one path, wherein the received signal comprises a continuous sequence of symbols $\phi_1, \phi_2, \ldots \phi_n$, each represented by a sequence of samples $X_0, X_2, \ldots X_{n-1}$ and wherein the symbols have a guard period of duration $T_{gp}$ at the beginning thereof, each guard period containing a cyclic prefix with the same subsequence of samples as a tail end portion of the associated symbol, the apparatus comprising:

an analog-to-digital converter for converting the received signal to digital form;

a synchronization unit comprising a processor configured to:

(I) delay the received signal by a fixed number of samples;

(ii) compute the correlation of the received signal with the delayed signal;

(iii) compute the summation of said correlation over a window of duration $T_i$, wherein $T_i > T_{gp}$;

(iv) slide said window over the correlation to find a characteristic point or region; and (v) derive the start of each symbol for further processing from said characteristic point or region; and a demodulator for demodulating each symbol identified by the synchronization unit in step (v), wherein the channel impulse response is less than the guard period $T_{gp}$, and said characteristic point or region is a substantially top-flat region, and wherein the processor identifies the start of the symbol for further processing by locating a point within said top-flat region and clear of the boundaries thereof and subtracting therefrom a fixed time value to find a point free of inter-symbol interference and clear of the boundaries where inter-symbol interference occurs.

16. An apparatus as claimed in claim 15, wherein the processor is configured to derive the start of each symbol from said characteristic point or region by subtracting a fixed time value from said point or a point lying within said region.

17. An apparatus as claimed in claim 16, wherein said fixed time value is $T_i - T_{gp}$.

18. An apparatus as claimed in claim 17, wherein $T_i \geq 1.1 T_{gp}$.

19. An apparatus as claimed in claim 18, wherein the $T_i = 2 T_{gp}$.

20. An apparatus as claimed in claim 15, wherein the processor obtains the point located within said top-flat region by taking the average of the start and end points of the top-flat region.

21. An apparatus as claimed in claim 20, wherein said fixed time value is $T_i - T_{gp}$.

22. An apparatus as claimed in claim 15, wherein the processor is configured to compute the correlation for each symbol by computing the product of the complex conjugate of the received signal and the delayed signal, or the product of the received signal and the complex conjugate of the delayed signal; and wherein the summation is performed on the magnitude of said summation.

23. An apparatus as claimed in claim 15, wherein the received signal is an OFDM signal containing OFDM symbols.

24. An apparatus as claimed in claim 23, wherein said fixed period is equal to the duration of a symbol less $T_{gp}$.

25. An apparatus as claimed in claim 23, wherein the physical medium comprises sound or video images.

26. An apparatus for demodulating a received signal representing a physical medium wherein the received signal may travel over more than one path, wherein the received signal comprises a continuous sequence of symbols $\phi_1, \phi_2, \ldots \phi_n$, each represented by a sequence of samples $X_0, X_2, \ldots X_{n-1}$, and wherein the symbols have a guard period of duration $T_{gp}$ at the beginning thereof, each guard period containing a cyclic prefix with the same subsequence of samples as a tail end portion of the associated symbol, the apparatus comprising:

an analog-to-digital converter for converting the received signal to digital form;

a synchronization unit comprising a processor configured to:

(I) delay the received signal by a fixed number of samples;

(ii) compute the correlation of the received signal with the delayed signal;

(iii) compute the summation of said correlation over a window of duration $T_i$, wherein $T_i > T_{gp}$;

(iv) slide said window over the correlation to find a characteristic point or region; and (v) derive the start of each symbol for further processing from said characteristic point or region; and a demodulator for demodulating each symbol identified by the synchronization unit in step (v), wherein the channel impulse response is greater than the guard period $T_{gp}$ and the characteristic point or region is a peak associated with the point of substantially least inter-symbol interference, and wherein the processor identifies the start of the symbol for further processing by subtracting from said peak a fixed time value to find the point of substantially least inter-symbol interference.

27. An apparatus as claimed in claim 26, wherein said fixed time value is $T_i - T_{gp}$.

28. A method of identifying a start time of a symbol in a wireless signal where the symbol is separated from a previous symbol by a guard interval GP, and the GP includes a sequence of samples identical with the last sequence of samples in the symbol, comprising:
   a) receiving the guarded symbol including the GP and the symbol;
   b) delaying the guarded symbol by GP to obtain a delayed version of the guarded symbol;
   c) processing the guarded symbol and the delayed version to identify a start time interval characterized by a low inter-symbol interference; and
   d) selecting the start time for symbol in the time interval,
   wherein step c) is performed over a time t that is greater than the guard interval GP, and
   wherein step c) comprises determining a product of the complex conjugate of the guarded symbol and the delayed variant or the guarded symbol and the complex conjugate of the delayed variant;
   summing the product over a window of duration τ; and
   sliding said window over the magnitude of said summation to find a top-flat region where the summation is substantially constant and at its greatest value.

29. A synchronization unit for finding the start position of a signal in a received signal comprising a continuous sequence of symbols $\phi_1, \phi_2, \ldots \phi_n$, each represented by a sequence of samples $X_0, X_2, \ldots X_{n-1}$, and wherein the symbols have a guard period GP of duration $T_{gp}$ at the beginning thereof, each guard period containing a cyclic prefix with the same subsequence of samples as a tail end portion of the associated symbol, the synchronization unit comprising a processor configured to:
   (i) delay the received signal by a fixed number of samples;
   (ii) compute the correlation of the received signal with the delayed signal;
   (iii) compute the summation of said correlation over a window of duration $T_i$, wherein $T_i > T_{gp}$;
   (iv) slide said window over the correlation to find a characteristic point or region; and
   (v) derive the start of each symbol for further processing from said characteristic point or region, and
   if the channel impulse response is less than the guard period $T_{gp}$, and said characteristic point or region is a substantially top-flat region, the processor is configured to identify the start of the symbol for further processing by locating a point within said top-flat region and clear of the boundaries thereof and subtracting therefrom a fixed time value to find a point free of inter-symbol interference and clear of the boundaries where inter-symbol interference occurs, and
   if the channel impulse response is greater than the guard period $T_{gp}$ and the characteristic point or region is a peak associated with the point of substantially least inter-symbol interference, the processor is configured to identify the start of the symbol for further processing by subtracting from said peak a fixed time value to find the point of substantially least inter-symbol interference.

* * * * *